Feb. 1, 1944. C. A. TOCE ET AL 2,340,441
AUTOMATIC PARKING METER
Filed Feb. 9, 1940 5 Sheets-Sheet 3
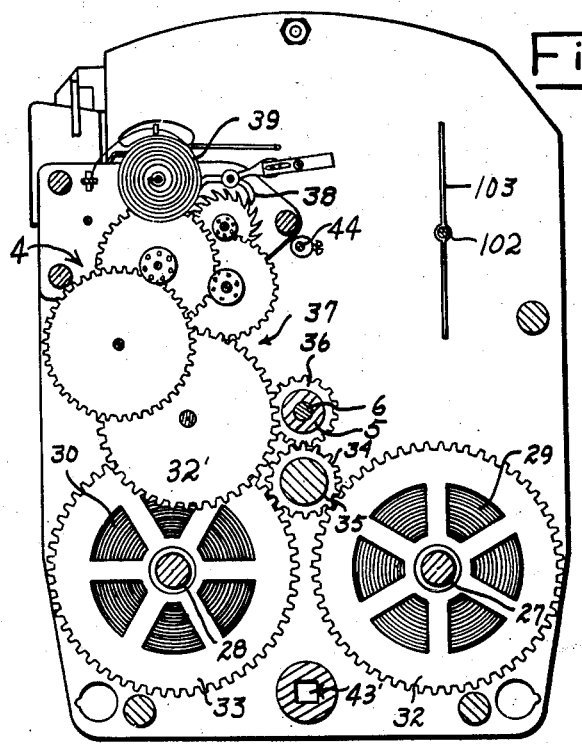
Fig. 7
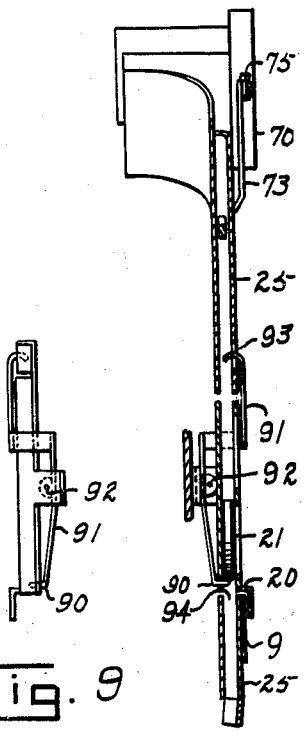
Fig. 9
Fig. 11
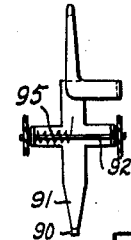
Fig. 10
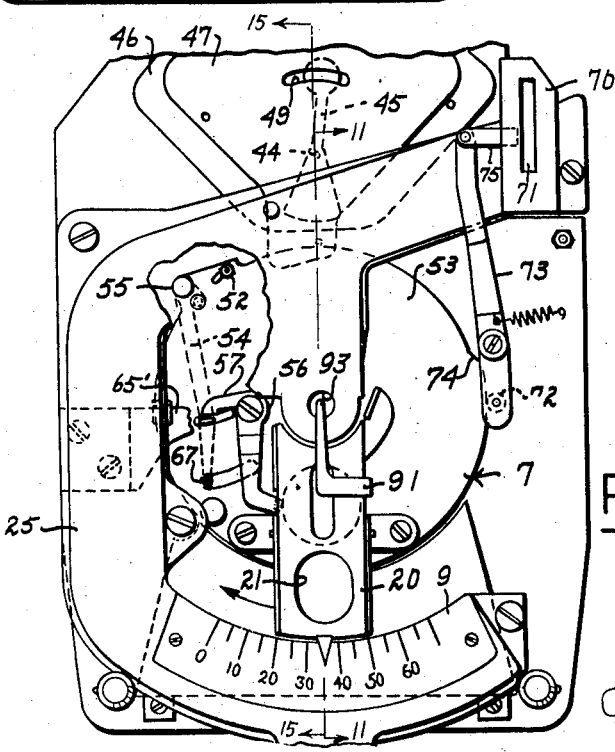
Fig. 8
Inventors
ROBERT F. BROUSSARD
CHARLES A. TOCE
Jesse R. Stone
& Lester D. Clark Attorneys Feb. 1, 1944.   C. A. TOCE ET AL   2,340,441
AUTOMATIC PARKING METER
Filed Feb. 9, 1940   5 Sheets-Sheet 4

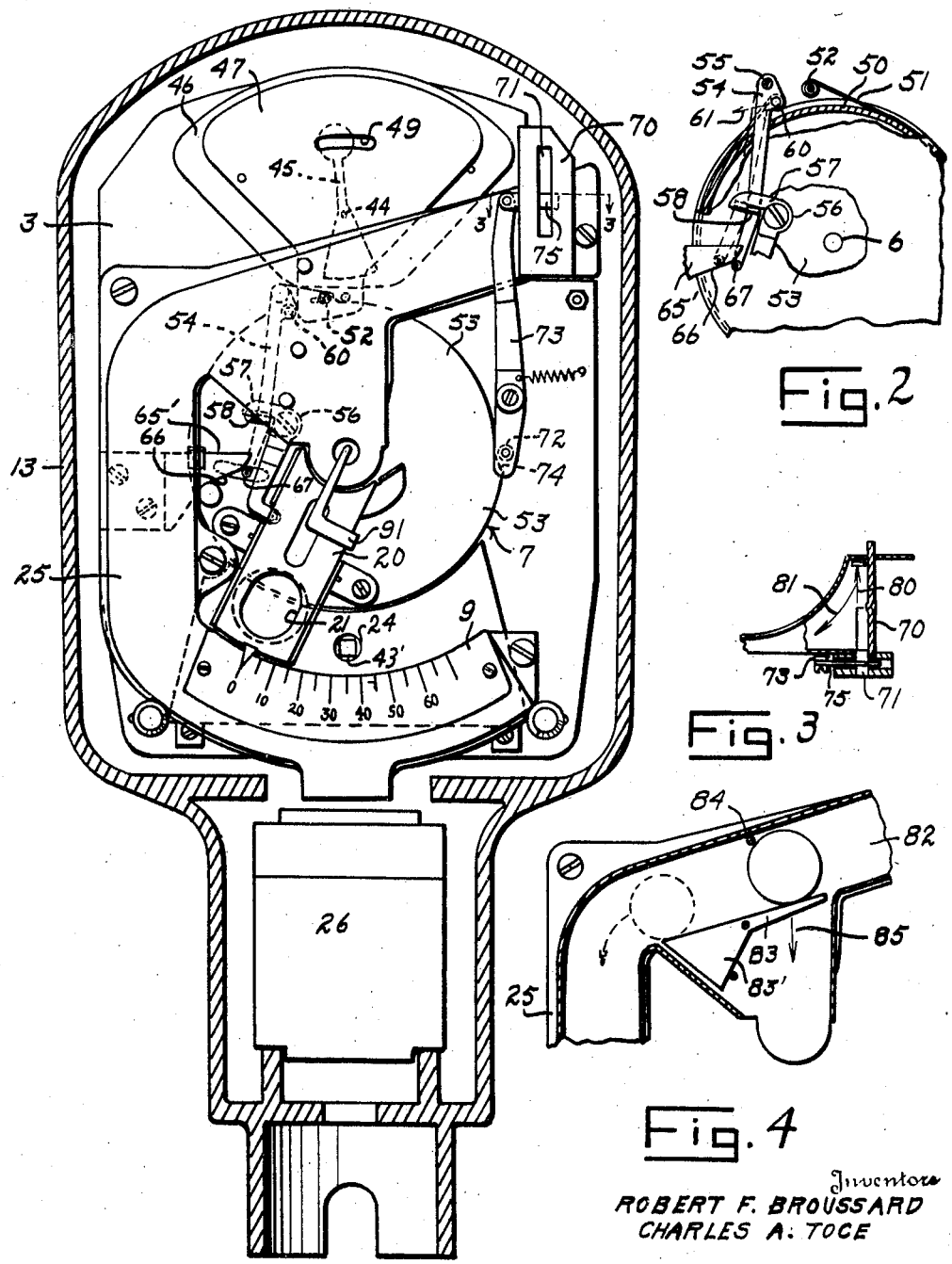

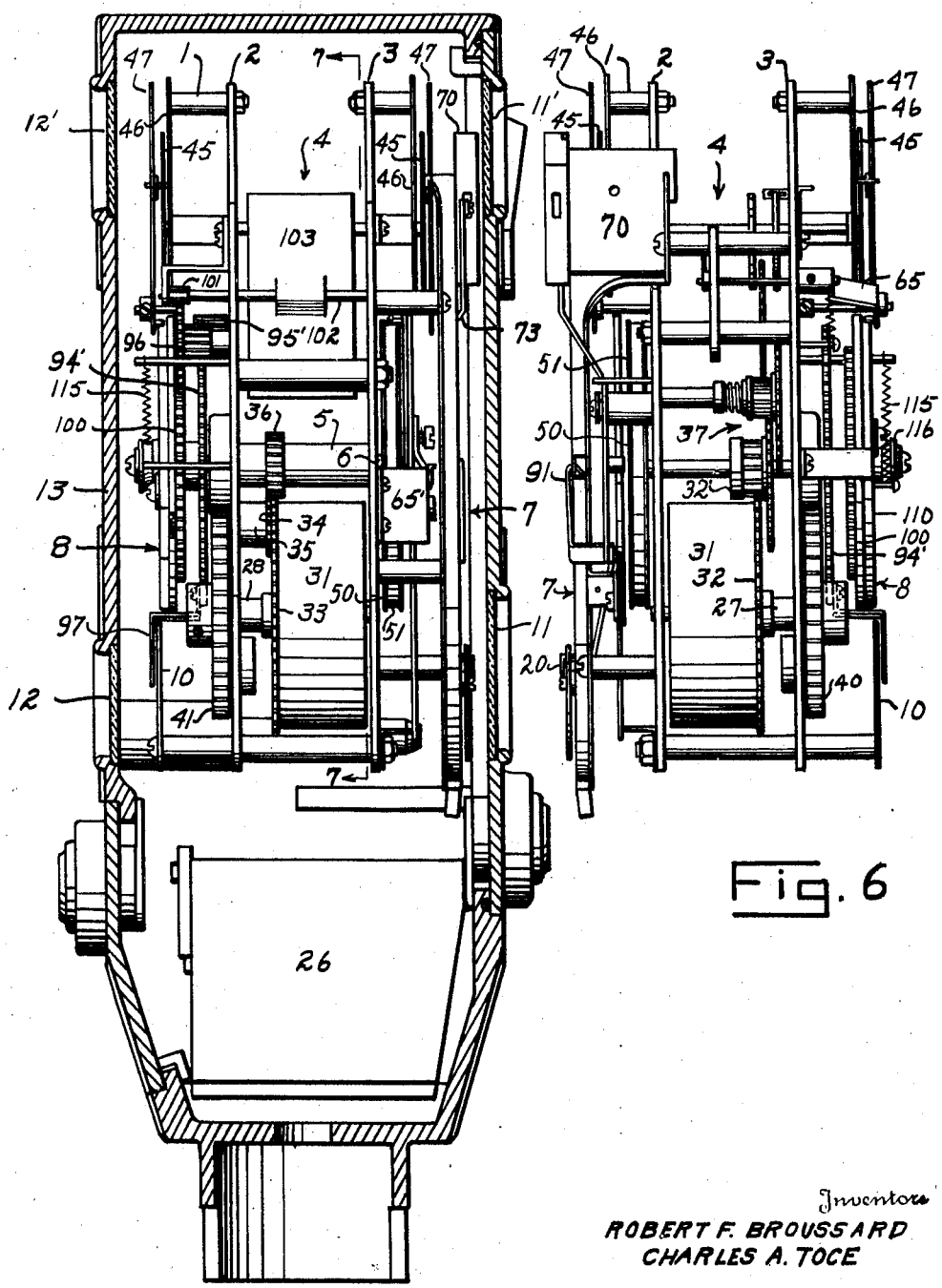

Inventors
ROBERT F. BROUSSARD
CHARLES A. TOCE

By Jesse R. Stone
Leslie D. Clark
Attorneys

Feb. 1, 1944.  C. A. TOCE ET AL  2,340,441
AUTOMATIC PARKING METER
Filed Feb. 9, 1940  5 Sheets-Sheet 5

ROBERT F. BROUSSARD
CHARLES A. TOCE
INVENT.
BY Jesse R. Stone
Lester B. Clark
Attorneys.

Patented Feb. 1, 1944

2,340,441

UNITED STATES PATENT OFFICE 2,340,441

AUTOMATIC PARKING METER

Charles A. Toce and Robert F. Broussard, Houston, Tex., assignors, by direct and mesne assignments, to Vehicular Parking, Ltd., Newark, N. J., a corporation of Delaware Application February 9, 1940, Serial No. 318,016

7 Claims. (Cl. 161—15)

This invention relates to parking meters and more particularly to a mechanism which is automatically operated by the deposit of a coin or token for indicating the period of time which elapses after the device was placed in operation.

The primary object of the invention is to provide a meter of the type described which is automatic in operation upon the insertion of a proper coin or token therein.

Another object is to provide a parking meter in which the time indicating mechanism is normally urged to initial starting or zero position and is automatically released upon the deposit of a coin so that the mechanism will return to such position.

Another object is to provide a timing mechanism which is automatically stopped when a predetermined time interval has elapsed after the operation thereof is initiated.

A further object is to provide a parking meter which exhibits an overtime indicator after a predetermined time interval has elapsed.

Still another object is to provide a device of the class described which may be readily adjusted for operation for any desired period of time.

Still another object is to provide a mechanism which is positive in action and which is simple and economical to construct and maintain.

The foregoing objects together with additional objects will become apparent from the following description taken in connection with the drawings in which:

Fig. 1 is a front elevational view of the illustrative embodiment of the invention, the mechanism being shown within a protective housing which is cut away to more clearly show the invention and is a section taken on the line 1—1 of Fig. 14.

Fig. 2 is a detail showing the construction of the clutching mechanism whereby the time interval indicating mechanism is releasably connected to the timing mechanism.

Fig. 3 is a sectional view taken on line 3—3 in Fig. 1;

Fig. 4 is a detail of the coin chute;

Fig. 5 is a side elevational view taken from the left in Fig. 1;

Fig. 6 is a side elevational view taken from the right in Fig. 1, the protective housing being entirely omitted in this view;

Fig. 7 is a sectional view taken on line 7—7 in Fig. 5;

Fig. 8 is an elevational view similar to Fig. 1 but showing the relative position of parts during an interval of operation;

Fig. 9 is a detail of the coin mechanism incorporated in the pointer of the time interval indicator;

Fig. 10 is a view of the mechanism shown in Fig. 9 but taken at right angles thereto;

Fig. 11 is a sectional view thru the coin passage taken on line 11—11 in Fig. 8;

The invention as shown in the illustrated embodiment (Figs. 5 and 6) comprises essentially a frame 1 comprising front and rear frame members 2 and 3 between which is located a timing mechanism generally designated as 4.

Figure 15:
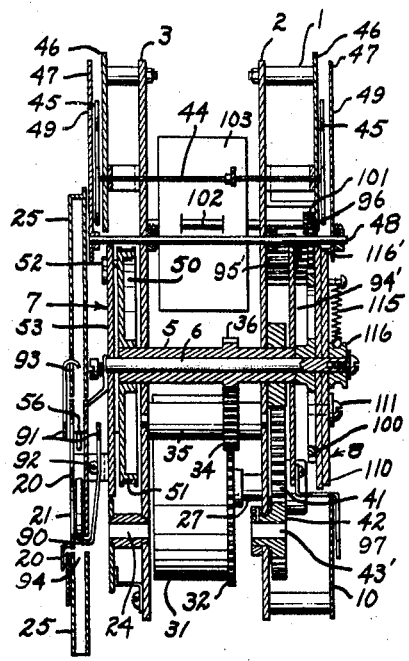
Fig. 15 is a sectional view taken on the line 15—15 of Fig. 8 and looking to the left in the direction of the arrows.

A tubular shaft 5 is mounted in the frame members and a solid shaft 6, as best seen in Figs. 7 and 15 passes thru this tubular shaft 5 and has movable time indicating means 7 and 8 operatively connected to the front and rear ends thereof. Mounted upon the frame 1 proximate the time indicating members 7 and 8 are indicating dials 9 and 10 which are visible thru the front and rear windows 11 and 12 respectively in the housing 13 so that pointers driven by the members 7 and 8 indicate elapsed time after operation of the device was initiated.

The time indicating means 7 on the front of the device comprises a hand or pointer 20 which has a coin passage having a front opening 21 within which an actuating coin is retained adjacent the window 11 in the housing during a period of operation of the device initiated by such coin. A coin chute generally indicated as 25 is attached to the frame 1 and has a lower arcuate portion to which is attached the indicating dial 9 as best seen in Figs. 11 and 15. This arcuate portion has an upwardly opening slot 94 proximate the opening at the lower end of the pointer 20 so that a coin released from within the pointer is received within such slot and is conducted by the coin chute to the coin receiving chamber therebelow. The chute 25 also has a by-pass passage about the passage in the pointer to conduct coins of improper size to the coin receiving chamber 26 within the base of the housing 13 in a manner that will more fully appear.

Referring to Fig. 7, the timing mechanism comprises a pair of shafts 27 and 28 mounted in the frame and having the inner ends of springs 29 and 30 attached thereto. The other ends of these springs are attached to spring barrels 31 which are integral with the wheels 32 and 33. Each of these wheels meshes with a pinion 34 mounted upon a shaft 35. The pinion 34 meshes in turn with a gear 36 fixed to the tubular shaft 5.

By means of the construction as just described the energy stored in the springs 29 and 30 is imparted to the gear 36 so that the shaft 5 will be driven thereby. The speed at which the shaft 5 is driven will be controlled by the gear train 37 to which power is imparted from wheel 32 to gear 32' and thence through intermediate gears of the train 37 to the escapement 38 operated in a step-by-step manner by a balance wheel which oscillates under the influence of a hair spring 39. Constructional details of the timing mechanism are not of the essence of the invention and are relatively conventional. It is therefore believed apparent from the foregoing description as to the construction and manner of operation of this portion of the mechanism.

Attention is, however, directed to the fact that the pallet shaft of the escapement 38 is provided with an arm and link connection 43 (Fig. 14) to a shaft 44 which carries a pair of small flags 45. These flags therefore oscillate in front of plates 46 which are preferably colored red opposite the windows 11' and 12' in the housing 13. The flags 45, in the preferred construction, are of a contrasting color so that the operation of the timing mechanism is readily apparent at all times.

Figures 12, 13:
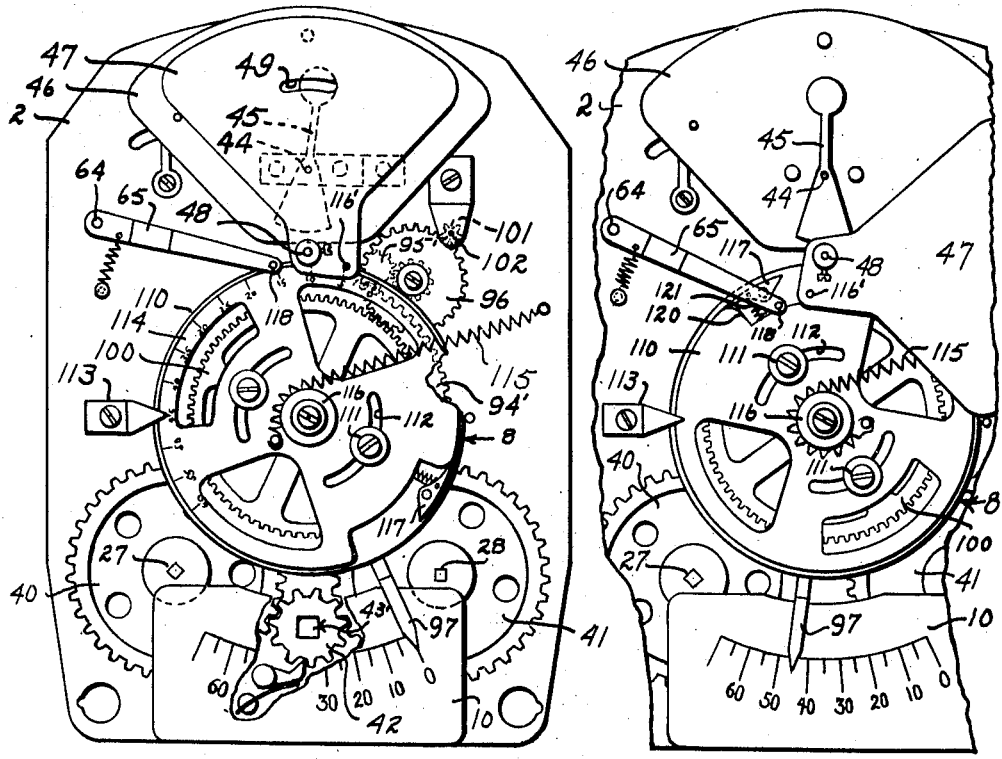
Fig. 12 is a rear elevational view with certain parts cut away and other parts omitted for purposes of clarity.
Fig. 13 is a rear elevational view similar to Fig. 12 but showing the relative position of parts during an interval of operation.

During the period of operation for which the meter is adjusted a pair of green flags 47 mounted on a shaft 48 overlie the small flags 45 and are provided with a slot 49 whereby the movement of the flags 45 is observable even though the green flags 47 are in elevated position as indicated in each of Figs. 1, 8 and 12.

Figure 14:
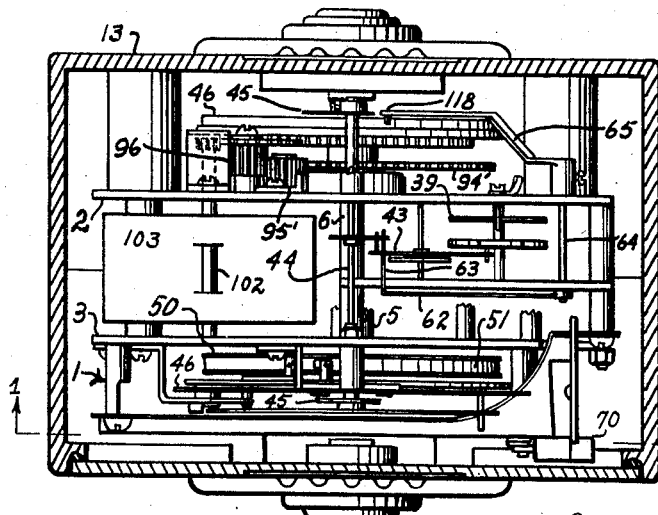
Fig. 14 is a top plan view of Fig. 1 with the top of the housing cut away.

As best seen in Fig. 14 an arm 62 having a flanged end 63 is adapted to engage the link connection 43 between the escapement pallet and the shaft 44 whereby the movement of the pallet may be arrested. The arm 62 is mounted upon a rock shaft 64 to which an additional arm 65 is attached at the rear of the meter assembly whereby this assembly serves to arrest the timing assembly during a period when the device is not in use.

The construction whereby the timing mechanism may be wound is best shown in Fig. 12 as comprising gear wheels 40 and 41 which are secured to the rear ends of the shafts 27 and 28 respectively. Each of these gears meshes with a ratchet pinion 42 having a non-circular opening 43' centrally thereof and accessible through opening 24 at the front of the meter so that a suitable winding key or its equivalent may be inserted. It is to be understood that the mechanism is so constructed as to drive the time indicating elements for a material length of time. Since the device is in use only periodically the meter will operate over a long period of time from a single winding.

The forward end of the hollow shaft 5 is provided with a drum 50 surrounded by a band 51 (Fig. 2) of which one end is anchored at 52 to a plate 53 of the indicating means 7 on the forward end of the shaft. The other end of the band is attached to an arm 54 pivotally mounted at 55 upon the plate 53. This arm is normally held in the position shown in Fig. 2 by a latching bell crank lever 56 pivoted on the plate 53 and having outwardly extending latch arm 57 to engage a projection 58 on the arm 54. When the latch arm is released by the deposit of a coin, as will more fully appear, the inherent resiliency of the band 51 will cause the arm to move to the position shown in dotted outline, the pivoted end 60 of the band 51 moving in the direction indicated by the arrow 61 so that the band is released from the drum 50 and the disc 53 is free to rotate to bring the pointer 20 to an initial or zero timing position.

An ear 65' is mounted upon the frame member 3 and has a camming surface 66 which is contacted by a roller 67 on the lower end of the arm 54 as the disc 53 is rotated to bring the pointer 20 to the zero position upon the scales 9 and 10. This permits the latch arm 57 of the bell crank lever 56 to engage the projection 58 upon the arm 54 so that the band 51 is held in driving engagement with the drum 50 during a period of operation of the device following the deposit of a coin therein.

From the foregoing it seems apparent that the timed rotation of the shaft 6 is effected by a clutching connection thereto of the drum 50 which is driven by the shaft 5. In this manner the shaft 6 and the assembly driven thereby is desirably operated in a timed manner during an interval of operation of the device and also such assembly is returned to a predetermined starting position when the clutch connection between the shaft 5 and 6 released.

It is to be noted that the lower end of the bell crank lever 56 projects into the coin passage in the pointer 20 so that a coin passing therethru will be instrumental in releasing the latch arm 56 from the lever 54. It is also to be noted that the position of the bell crank lever is such that the lower arm thereof is effective to operate under the force of gravity to cause the arm 57 to latch with the projection 58 when the time indicating means 7 moves to the zero position as shown in Fig. 1.

The coin receiving unit includes a head 70 having a coin slot 71 which mates with a complementary slot in the housing 13. When a proper coin is deposited and the pointer 20 approaches zero position, a roller 72 on the lever 73 moves downwardly over the camming surface 74 on the disc 53. This causes the upper end of the lever 73 to move to the right (Fig. 1) and move the coin stop 75 across the slot 71 so that an additional coin cannot be deposited until sufficient time has elapsed that the roller 72 is cammed upwardly over the surface 74.

The interior of the head 70 is contoured as shown in Fig. 3 so that a coin inserted in the direction indicated by the arrow 80 moves under gravity downwardly and outwardly as indicated by the arrow 81 to enter the passage 82 (Fig. 4). If the coin or token is smaller than that for which the unit is designed such coin will ride over the counterweighted lever 83 and beneath a pin 84 and will pass downwardly within the coin chute 25 and into the coin receiver 26. A coin of proper size will strike the pin 84 and will be of sufficient weight to overcome the counterbalance 83' of the lever 83, whereupon the coin will move downwardly as indicated by the arrow 85 and will enter the passage in the pointer 20.

A previously deposited coin is held adjacent the opening 21 in the pointer 20 by the flanged end 90 (Figs. 11 and 15) of a lever 91 which is pivoted at 92 on the back of the pointer 20. The upper end of this lever extends around and to the front side of the pointer and has the end thereof projected thru an opening 93 at the center of rotation of the pointer. As the newly deposited coin moves downwardly the upper end of the lever 91 is forced outwardly and the previously deposited coin is released to fall into the coin chute which has an upwardly opening slot 94 adjacent the end of the pointer 20 so that the released coin will be directed to the coin receiver 26.

The deposited coin next engages the end of the bell crank lever 56 and thereby releases the clutch connection between the time indicating mechanism and the timing or driving mecchanism already described. After such actuation has been effected the coin is stopped in front of the opening 21 since the lever 91 has again returned to coin holding position under the influence of a small tension spring 95.

Reference is now made to the time indicating means 8 which is driven from the shaft 6 at the rear of the meter. A gear 94' fixed to the shaft 6 engages an idling gear 95' to drive a composite gear 96 which meshes with pinion 101 on a shaft 102 to which a vane 103 is attached. The gear 96 also engages a gear 100 rotatably mounted upon the outer end of the shaft 6 and to which a disc 110 is attached by means of screws 111 passing thru slots 112 so that the disc is angularly adjustable relative to the gear 100. As will more fully appear this construction provides for adjustment of the period of operation of the device, such period being indicated by the position of the pointer 113 upon the scale 114 on the disc 110.

The time indicating assembly is constantly urged toward zero or starting position by a tension spring 115 attached to the plate 2 and the disc 110 and passing over the boss 116 on the disc.

It is to be noted that the pointer 97 which moves over the scale 10 is attached to and moves with the gear 94' (Figs. 5 and 6), such pointer therefore moving over the same arc as the pointer 20 during a timed interval or the return of the pointers to a zero or initial position.

For further constructional details of the illustrated embodiment of the invention reference will now be made to the manner of operation of the described construction. It will be assumed that the disc 110 has been adjusted as indicated in Fig. 12 so that the meter will operate for a period of forty-five minutes. It will also be assumed that a coin, previously deposited is held beneath the opening 21 in the pointer 20 and that sufficient time has elapsed subsequent to the deposit of such coin that the disc 110 has rotated until a pin 116' in the flag 47 has passed over the tip of a lever 117 pivotally mounted on the disc 110 so that the outer surface of the lever 117 is continuous with the disc 110. The flag 47 has therefore fallen to the position shown in Fig. 13. Likewise the lever 117 has moved from beneath a pin 118 on the arm 65 and the arm 62 has moved downwardly to engage the link connection 43 between the escapement pallet and the shaft 44 to stop the timing mechanism.

The coin is then inserted in the slot 71 and moves downwardly in the pointer 20 and, during its passage releases the previously deposited coin and also engages the end of the bell crank lever 56 to release the clutch connection between the timing mechanism and the time interval indicator assembly. Thereupon the clutch connection between the shaft 6 and the time indicator assembly will be released and the assembly will be rotated under the influence of spring 115 until the roller 67 rides upon the cam surface 66 of the ear 65 to cause the clutch connection between the time interval indicator and the timing mechanism to be reengaged. During the movement of the time interval indicator assembly the pin 118 on the arm 65 rides over the radially camming surface 120 on the disc 110 and lifts the arm 117 against the tension of spring 121. Thereafter the pin 118 rides upon the periphery of the disc 110 so that the timing mechanism will begin operation.

In a similar manner the pin 116' of the flag 47 will ride upon the surface 120 and the flag will thus be lifted to operating position.

Following the sequence of operations just described the mechanism will operate at a timed rate to indicate the interval of time elapsing after the coin was deposited and until the above assumed conditions have again been reached when it will again be necessary to deposit a coin in order to initiate subsequent operation of the device.

While the invention has been described by reference to a specific embodiment thereof, broadly the invention comprehends a meter of the class described which is simple and efficient and which is set in operation automatically upon the deposit of a proper coin or token.

What is claimed is:

1. In a device of the class described the combination of, a timing mechanism, a tubular shaft driven thereby, a second shaft extending through said tubular shaft, time indicating dials proximate the ends of said second shaft, pointers driven by said second shaft in proximity to said dials, a releasable connection between said shafts, and means operable by a coin to release said connection, and means for thereafter rotating said second shaft and moving the pointers to a predetermined indicating position.

2. In a device of the class described the combination of, a clock rotated tubular shaft, a second shaft extending therethrough, time indicating dials proximate the ends of said second shaft, pointers driven by said second shaft in proximity to said dials, a releasable connection between said shafts, means normally urging said second shaft to rotate counter to the direction of rotation of the tubular shaft, means operable by a coin to release said connection so that the pointers may move to a predetermined indicating position, and means for reengaging the connection so that the second shaft is rotated by the clock rotated tubular shaft.

3. In a device of the class described the combination of, a clock rotated tubular shaft, a second shaft extending therethrough, pointers driven by said second shaft, a releasable connection between said shafts, means normally urging said second shaft to rotate counter to the direction of rotation of the tubular shaft, means operable by a coin to release said connection so that the second shaft will rotate under the influence of said first mentioned means, means for terminating the rotation of said second shaft when the pointers reach a predetermined position, and means for reconnecting the shafts with the pointers in such position.

4. In a device of the class described, timing means, a shaft driven thereby, a graduated scale having a zero or initial position indicated thereon, a pointer on said shaft adjacent said scale, means releasably connected to said shaft for driving the pointer over the scale at a timed rate, means normally urging the shaft to move the pointer toward the zero position on the scale, means operable by a coin to release the driving connection with the shaft, and means cooperating with said last mentioned means for reconnecting the shaft and driving means when the pointer has moved to zero position.

5. In a parking meter the combination of, a clock rotated shaft, a drum fixed thereon, a second shaft concentric of the first shaft, a disc on said second shaft, a friction band surrounding said drum and having one end attached to said disc, an arm pivotally mounted on said disc and connected to the other end of the friction band, and means for latching said arm in a position to maintain a driving engagement of the friction band with the drum whereby the shafts rotate in unison.

6. In a parking meter the combination of, a clock rotated shaft, a drum fixed thereon, a second shaft concentric of the first shaft, a disc on said second shaft, a friction band surrounding said drum and having one end attached to said disc, an arm pivotally mounted on said disc and connected to the other end of the friction band, a latch member on said disc for engaging said arm to hold the friction band in engagement with said drum, means on said disc for releasing said latch member by the passage of a coin whereby the friction band is released so that the second shaft may move independently of the clock rotated shaft.

7. In a parking meter the combination of, a clock rotated shaft, a drum fixed thereon, a second shaft concentric with the first shaft, a disc on said second shaft, a friction band surrounding said drum and having one end attached to the disc, an arm pivotally mounted on said disc and connected to the other end of said band, means for latching said arm to hold said band in engagement with the drum so that said second shaft is driven by the clock rotated shaft, coin operated means for releasing said last mentioned means so that the shafts rotate independently, means normally urging the second shaft to rotate in a direction counter to the direction of rotation of the clock rotated shaft, and a fixed camming member for engagement by said arm to move the arm to latching position as the disc is rotated to starting position.

CHARLES A. TOCE.
ROBERT F. BROUSSARD.